United States Patent
Okamoto et al.

(10) Patent No.: US 7,493,147 B2
(45) Date of Patent: Feb. 17, 2009

(54) COMMUNICATION TERMINAL AND COMMUNICATION METHOD THEREOF

(75) Inventors: Hideki Okamoto, Kanagawa (JP); Mariko Yuge, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 589 days.

(21) Appl. No.: 11/139,158

(22) Filed: May 27, 2005

(65) Prior Publication Data

US 2005/0266895 A1 Dec. 1, 2005

(30) Foreign Application Priority Data

May 31, 2004 (JP) ............................ P2004-162255

(51) Int. Cl.
*H04M 1/00* (2006.01)
(52) U.S. Cl. .................. 455/572; 455/509; 370/469
(58) Field of Classification Search .................. 455/572
See application file for complete search history.

(56) References Cited

U.S. PATENT DOCUMENTS

| | | | | |
|---|---|---|---|---|
| 5,909,437 | A * | 6/1999 | Rhodes et al. | 370/349 |
| 6,151,312 | A * | 11/2000 | Evans et al. | 370/338 |
| 6,269,402 | B1 * | 7/2001 | Lin et al. | 709/227 |
| 6,484,024 | B1 * | 11/2002 | Darnault et al. | 455/418 |
| 6,574,239 | B1 * | 6/2003 | Dowling et al. | 370/469 |
| 6,628,671 | B1 * | 9/2003 | Dynarski et al. | 370/469 |
| 6,856,804 | B1 * | 2/2005 | Ciotta | 455/435.1 |
| 6,912,581 | B2 * | 6/2005 | Johnson et al. | 709/228 |
| 7,065,359 | B2 * | 6/2006 | Chuah et al. | 455/436 |
| 7,075,908 | B2 * | 7/2006 | Noguchi et al. | 370/329 |
| 7,277,416 | B1 * | 10/2007 | Chang et al. | 370/338 |
| 7,298,733 | B2 * | 11/2007 | Sakai et al. | 370/352 |
| 7,324,474 | B2 * | 1/2008 | Shirota et al. | 370/328 |
| 7,349,363 | B2 * | 3/2008 | Vanttinen | 370/328 |
| 2002/0168959 | A1 * | 11/2002 | Noguchi et al. | 455/405 |
| 2003/0093459 | A1 * | 5/2003 | Dowling et al. | 709/201 |
| 2003/0185195 | A1 * | 10/2003 | Dowling et al. | 370/349 |
| 2003/0231611 | A1 * | 12/2003 | Nakao et al. | 370/338 |
| 2004/0187109 | A1 * | 9/2004 | Ross et al. | 718/100 |
| 2004/0218587 | A1 * | 11/2004 | Kim et al. | 370/352 |
| 2004/0243712 | A1 * | 12/2004 | Sakai et al. | 709/227 |
| 2005/0009535 | A1 * | 1/2005 | Cherian | 455/455 |

(Continued)

FOREIGN PATENT DOCUMENTS

JP 2002-345019 11/2002

(Continued)

*Primary Examiner*—Matthew D Anderson
*Assistant Examiner*—Hai V Nguyen
(74) *Attorney, Agent, or Firm*—Hogan & Hartson LLP

(57) ABSTRACT

A communication terminal has an EVDO radio control section which performs radio communication control based on an EVDO communication system, and a data communication control section which releases a data link and requests the EVDO radio control section to release a communication session if a power-off command is entered. The EVDO radio control section releases the communication session in response to the communication session release request made by the data communication control section. When the EVDO radio control section releases the communication session based on a command for a power-off processing, the EVDO radio control section maintains the communication session released. When the EVDO radio control section releases the communication session based on any command other than the command of the power-off processing, the EVDO radio control section performs the reconnection processing of the communication session.

20 Claims, 6 Drawing Sheets

U.S. PATENT DOCUMENTS

| | | | |
|---|---|---|---|
| 2005/0025184 A1* | 2/2005 | Dowling et al. | 370/469 |
| 2005/0041687 A1* | 2/2005 | Dowling et al. | 370/469 |
| 2005/0064891 A1* | 3/2005 | Chaudry et al. | 455/527 |
| 2005/0073969 A1* | 4/2005 | Hart et al. | 370/318 |
| 2005/0086376 A1* | 4/2005 | Park et al. | 709/245 |
| 2005/0091315 A1* | 4/2005 | Hurtta | 709/204 |
| 2005/0091388 A1* | 4/2005 | Kamboh et al. | 709/228 |
| 2005/0124345 A1* | 6/2005 | Laroia et al. | 455/437 |
| 2005/0130708 A1* | 6/2005 | Duncan Ho et al. | 455/561 |
| 2005/0141511 A1* | 6/2005 | Gopal | 370/395.2 |
| 2005/0169249 A1* | 8/2005 | Shirota et al. | 370/352 |
| 2005/0238034 A1* | 10/2005 | Gillespie et al. | 370/401 |
| 2006/0073836 A1* | 4/2006 | Laroia et al. | 455/450 |
| 2006/0120287 A1* | 6/2006 | Foti et al. | 370/231 |
| 2006/0153134 A1* | 7/2006 | Lee et al. | 370/331 |
| 2006/0210037 A1* | 9/2006 | Olafsson et al. | 370/93.34 |
| 2006/0229074 A1* | 10/2006 | Semper | 455/436 |
| 2007/0037610 A1* | 2/2007 | Logan | 455/574 |
| 2007/0104161 A1* | 5/2007 | Hossain et al. | 370/338 |
| 2007/0140199 A1* | 6/2007 | Zhao et al. | 370/338 |
| 2007/0178874 A1* | 8/2007 | Matsuyama | 455/343.1 |
| 2008/0004072 A1* | 1/2008 | Yu | 455/554.2 |
| 2008/0069140 A1* | 3/2008 | Xue et al. | 370/468 |
| 2008/0177994 A1* | 7/2008 | Mayer | 713/2 |

FOREIGN PATENT DOCUMENTS

| | | |
|---|---|---|
| JP | 2003-092782 | 3/2003 |

* cited by examiner

FIG. 3

| MODE | MAIN USE | Rx CIRCUIT (1) | Rx CIRCUIT (2) | Tx CIRCUIT | IMPEDANCE CONTROL SECTION |
|---|---|---|---|---|---|
| EVDO | DATA COMMUNICATIONS | O | O | O | 50 Ω |
| 1x | VOICE COMMUNICATIONS | O | X | O | NOT 50 Ω |

BLOCK OPERATION STATE IN EACH MODE (O: OPERATION, X: NON-OPERATION)

COMMUNICATION TERMINAL AND COMMUNICATION METHOD THEREOF

CROSS-REFERENCE TO RELATED APPLICATIONS

This application is based upon and claims the benefit of priority from the prior Japanese Patent Applications No. 2004-162255 filed on May 31, 2004, the entire contents of which are incorporated herein by reference.

BACKGROUND OF THE INVENTION

1. Field of the Invention

This invention relates to a communication terminal for performing radio communications, such as a mobile telephone, and a communication method thereof, and in particular to a communication terminal having a transmission-reception function conforming to a plurality of radio communication systems, such as CDMA2000 1× and CDMA2000 1×EV-DO, for performing radio communications in accordance with any of the communication systems and a communication method of the communication terminal.

2. Description of the Related Art

In recent years, a radio communication terminal such as a mobile telephone for enabling the user to use a plurality of radio networks has been in practical use. In this kind of radio communication terminal, communication quality information such as the communication speed can be displayed.

As a high-speed radio communication system, CDMA2000 1×EV-DO (1× × EVolution Data Only) is about to be put to practical use.

As for the communication quality information of the communication system of CDMA2000 1× widely available at present, determination of the reception state, etc., is based on the instantaneous values of pilot signal strength to total reception signal strength (Ec/Io), carrier to interference ratio (CIR), etc., found from the pilot signal received from a base station because change in the data communication speed depending on the location is not much noticeable.

On the other hand, the communication quality information of the communication system of CDMA2000 1×EV-DO is provided by averaging the data communication speed (DRC: Data Rate Control Bit) predicted in the radio communication terminal based on the reception state (received electric field strength), C/I (Carrier to Interference), etc., and is displayed on a display section for informing the user. (For example, refer to JP-A-2002-345019 and JP-A-2003-92782.)

This enables the user of a radio communication terminal adopting the CDMA2000 1×EV-DO communication system to precisely keep track of the communication state.

To perform data communications using a radio communication terminal, the difference between performing radio communications in accordance with the CDMA2000 1× communication system and performing radio communications in accordance with the CDMA2000 1×EV-DO communication system will be discussed in association with FIGS. 6 and 7.

FIG. 6 is a schematic representation for performing radio communications in accordance with the CDMA2000 1× communication system. FIG. 7 is a schematic representation for performing radio communications in accordance with the CDMA2000 1×EV-DO communication system.

To begin with, to perform radio communications, a link as shown in FIGS. 6 and 7 needs to be established between a base station 1 and a mobile machine (radio communication terminal) 2.

To perform radio communications in accordance with the CDMA2000 1× communication system (simply, 1× communication system), a data link and radio connection need to be established.

In contrast, to perform radio communications in accordance with the CDMA2000 1×EV-DO communication system (simply, EVDO communication system), a radio (communication) session needs to be established in addition to a data link and radio connection.

Here, the data link refers to PPP (Point to Point Protocol).

The radio connection is connection for establishing radio physical connection with a network. The radio connection is established so as to actually start data communications by allocating radio resources. If communications are not performed, the radio connection is released as required.

The communication session exists only in the EVDO communication system and is established for sharing the settings, etc., required for performing communications. The communication session is held established, whereby radio setting processing at the communication start time can be skipped.

In the EVDO communication system, when power is on, the communication session is always held and therefore an attempt is made to hold the communication session by performing reconnection processing immediately after the communication session is released.

In the EVDO communication system, if inferior radio connection is released, the communication session is not released; if a superior data link is released, the communication session must be released.

In the EVDO communication system, since the communication session is not frequently released, when the communication session is established, the parameters used for communications are transmitted to the network for establishing the communication session, and the communication session is held established regardless of whether or not the information to be communicated exists so that data communications can be performed instantly. Therefore, it takes time to establish the communication session.

More particularly, at present, in the EVDO communication system, continuous connection is specified when the power is on. Since a standby mode is based on the 1× communication system, notification of starting communications according to the EVDO communication system is made based on the 1× communication system. Therefore, communications are started in the 1× communication system and then a transition is made to the EVDO communication system.

It will take time to establish the communication session required for the EVDO communication system during the transition processing.

Thus, the data required for the communication session is previously transmitted to the network for always establishing the communication session, and only when necessary, physical radio connection is established for performing data communications. Accordingly, the communication system transition can be made with good response and speedily.

As described above, in the 1× communication system, the communication session or the like is not held and thus setting processing is performed when radio connection is established (when communications are started), but a release processing only needs to be performed when the radio connection is broken.

In contrast, in the EVDO communication system, the communication session is held and thus setting processing need not be performed when radio connection is established (when communications are started), so that prompt connection can be made.

However, in the case of terminating data communications, the communication session is released together with the superior data link, and re-establishment processing (reconnection processing) of the communication session is performed immediately after the communication session is released.

At the normal time, however, re-establishment processing is performed independently of data communications, etc., and the user may be unconscious of the establishment processing of the communication session and therefore no problem arises.

JP-A-2002-345019 and JP-A-2003-92782 are referred to as related art.

By the way, in the EVDO communication system, if a data link exists, when the power is turned off, the communication session must be released together with the data link.

In contrast, in the 1× communication system, when the power is turned off, even if radio connection is established, simple connection release processing needs only to be performed.

Likewise, in the EVDO communication system, the release processing of radio connection and the communication session is also performed, but the later communication session establishment processing is performed.

The communication session establishment processing time is longer than the time allowed for turning off the power (for example, three to five seconds).

Therefore, if the power-off method of a communication terminal in the 1× communication system in the related art is applied as it is, the protocol sequence is interrupted by forced power-off processing, etc., while the communication session is being established.

SUMMARY OF THE INVENTION

An object of the invention is to provide a communication terminal and a communication method thereof for enabling to skip a re-establishment processing of a communication session when power is off and shorten the time required for turning off the power.

The invention provides a communication terminal, having: a radio control section which performs radio communications conforming to a communication system for establishing a communication session by sending a parameter used for communications to a network, and performing a reconnection processing if the communication session is released so as to keep the communication session established regardless of whether or not information to be communicated exists, wherein when a communication session becomes to be released and the radio control section releases the communication session based on a power-off processing, the radio control section maintains the communication session released.

The invention also provides a communication terminal, having: a radio control section which performs radio communications conforming to a communication system for performing communications by connecting a physical connection by radio, a communication session for deciding a communication condition by sending a parameter used for communications to a network, and a data link for transmitting and receiving data in sequence with the network, and performing a reconnection processing if the communication session is released so as to keep the communication session established regardless of whether or not information to be communicated exists, wherein when the data link and the communication session become to be released and the radio control section releases the communication session based on a power-off processing, the radio control section maintains the communication session released.

The invention also provides a communication terminal, having: a radio control section which performs radio communications conforming to a first communication system for establishing a communication session by sending a parameter used for communications to a network, and performing a reconnection processing if the communication session is released so as to keep the communication session established regardless of whether or not information to be communicated exists, and a second communication system for sharing a communication section with the first communication system and enabling to establish the communication session when a communication connection is established, wherein when a communication session becomes to be released when the radio control section performs radio communications conforming to the first communication system and the radio control section releases the communication session based on a power-off processing, the radio control section maintains the communication session released.

In the communication terminal, the radio control section is on standby with the second communication system and is commanded to make a transition from the second communication system to the first communication system.

In the communication terminal, when the radio control section releases the communication session based on any processing other than the power-off processing, the radio control section performs the reconnection processing of the communication session.

The invention also provides a communication terminal conforming to a communication system for establishing a communication session by sending a parameter used for communications to a network, and performing a reconnection processing if the communication session is released so as to keep the communication session established regardless of whether or not information to be communicated exists, having: a radio control section which performs radio communications based on the communication system; and a data communication control section which releases a data link and requests the radio control section to release the communication session if a power-off command is entered, wherein the radio control section releases the communication session in response to the communication session release request made by the data communication control section, and when the radio control section releases the communication session based on a command for a power-off processing, the radio control section maintains the communication session released.

In the communication terminal, when the radio control section releases the communication session based on any command other than the command of the power-off processing, the radio control section performs the reconnection processing of the communication session.

The invention also provides a communication method of a communication terminal which performs radio communications conforming to a first communication system for establishing a communication session by sending a parameter used for communications to a network, and performing a reconnection processing if the communication session is released so as to keep the communication session established regardless of whether or not information to be communicated exists, and a second communication system for sharing a communication section with the first communication system and enabling to establish the communication session when a communication connection is established, wherein when a communication session becomes to be released when the communication terminal performs radio communications conforming to the first communication system and the communication session is released based on a power-off processing, the communication session is maintained released.

According to the communication terminal and the communication method, the re-establishment processing of the communication session at the power-off time can be skipped, the time required for turning off the power can be shortened, and the power can be turned off instantly.

BRIEF DESCRIPTION OF THE DRAWINGS

FIG. 3 is a drawing to show the operation state of each of circuits in an EVDO communication mode and a 1× communication mode of a radio communication section according to the embodiment of the invention;

DETAILED DESCRIPTION OF THE PREFERRED EMBODIMENTS

Referring to the accompanying drawings, there is shown an embodiment of the invention.

Figure 1:
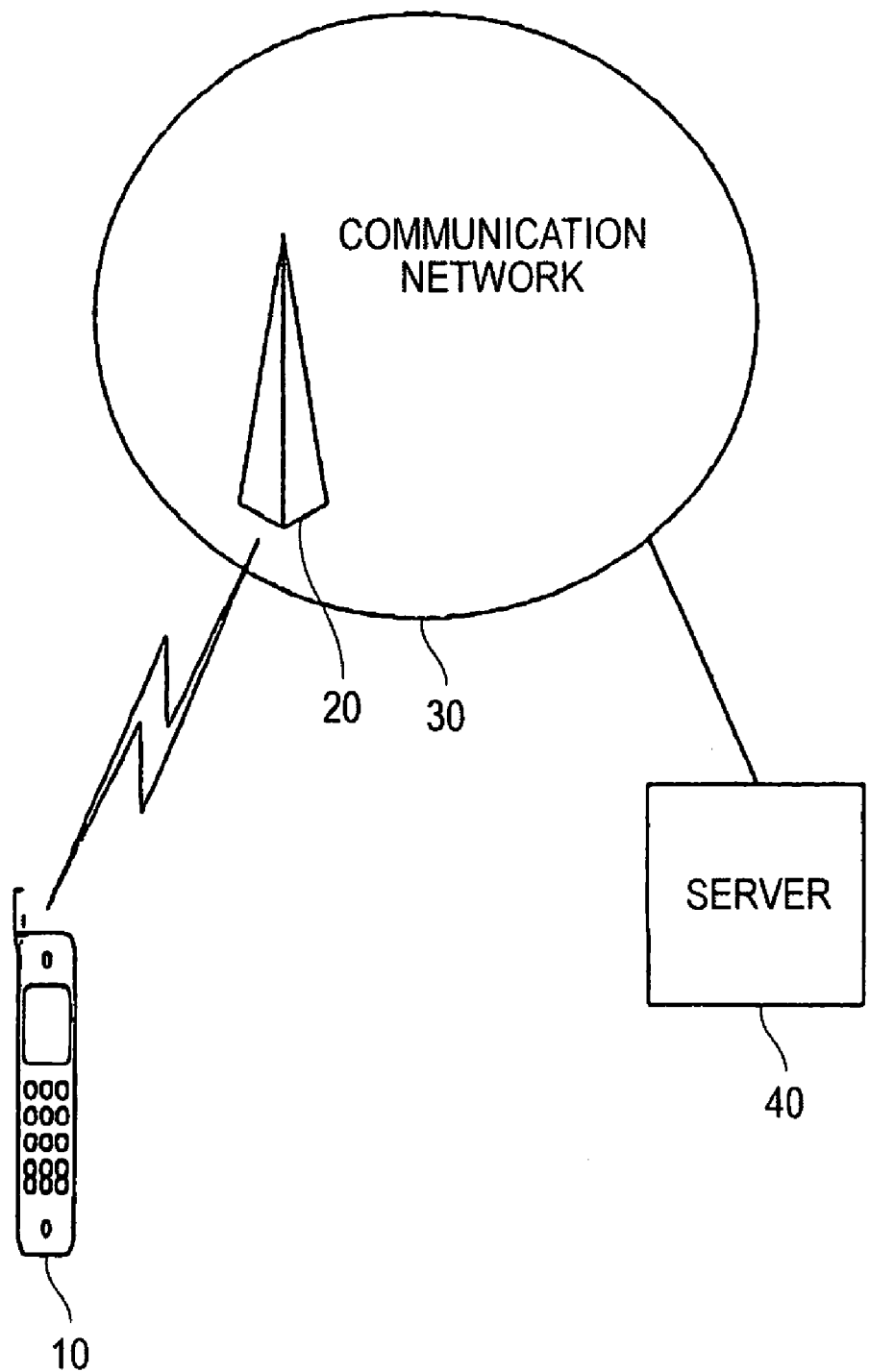
FIG. 1 is a system configuration drawing to show one embodiment of a radio communication system including a mobile telephone as a radio communication terminal according to the invention.

FIG. 1 is a system configuration drawing to show an embodiment of a radio communication system including a mobile telephone as a radio communication terminal according to the invention.

A mobile telephone 10 of the embodiment has a function of transmitting a request for sending any desired data to a server 40 from a radio communication section via a base station 20 through a communication network (network) 30, and displaying Web data, etc., sent in response to the request on a display section, as shown in FIG. 1.

The mobile telephone 10 of the embodiment has radio communication functions conforming to a first communication system (CDMA2000 1×EV-DO communication system, simply EVDO communication system) for establishing a communication session by sending parameters used for communications to the network, and keeping the communication session established regardless of whether or not the information to be communicated exists so that data communications can be performed instantly, and a second communication system (DMA2000 1× communication system, simply 1× communication system) for sharing a part of a communication section with the EVDO communication system and enabling to establish a communication session when the communication session is established.

In radio communications conforming to the EVDO communication system as the first communication system, when a communication session becomes to be released and the mobile telephone 10 releases the communication session based on a power-off processing, the mobile telephone 10 maintains the communication session released.

The mobile telephone 10 performs a reconnection processing (re-establishment processing) of the communication session if the communication session is released based on any processing other than the power-off processing (for example, in response to data communication termination.)

That is, in the embodiment, the mobile telephone 10 is configured as a radio communication terminal that can connect to the radio networks (communication networks) of the following two types of communication systems:

(1) Network of 1× communication system (IS95) normally connected; and (2) Network of EVDO communication system with the communication speed higher than that of the radio network (1) normally connected, but a narrower service area.

In the EVDO communication system, based on information indicating the reception state from a radio communication terminal, the base station 20 switches the modulation system of the data transmitted to the radio communication terminal, whereby it is made possible to use a high communication rate although error tolerance is low when the reception state of the terminal is good and use a low communication rate although error tolerance is high when the reception state of the terminal is poor.

In the down direction of the EVDO communication system (from the base station to a radio communication terminal), the time division multiplexing access (TDMA) is adopted wherein the time is divided in 1/600 second units for performing communications only with one radio communication terminal in the time slot and switching the radio communication terminal to communicate with according to the time, thereby communicating with a plurality of radio communication terminals. Accordingly, it is made possible to always perform data transmission with the maximum power to each radio communication terminal, and data communications between the radio communication terminals can be performed at the maximum communication speed.

By the way, it is assumed that a radio communication terminal adopting the EVDO communication system is used under a strong electric field, and not much importance is placed on antenna gain.

To improve the reception performance, diversity communications are performed using a plurality of antennas and reception circuits so as to provide the performance even in a fading environment. Although a mobile machine can be configured even with one reception circuit, better performance is provided by two or more reception circuits.

The radio communication terminal adopting the EVDO communication system specifically has an RF front end section implemented as a combination of a transmission-reception circuit corresponding to a main antenna and a reception-only circuit corresponding to a subantenna.

The signals provided by a plurality of reception circuits are combined according to a maximum specific combining method or a minimum mean squared error method, compensating for degradation of the reception performance in a fading environment.

Generally, making a comparison between the reception state when one antenna is used (diversity is not performed) and the reception state when two antennas are used (diversity is performed), it is known that if two antennas are used (diversity is performed), the effect of interference is extremely small as compared with the case where one antenna is used (diversity is not performed).

In contrast, the radio communication terminal used with the communication system of the 1× communication system is assumed to provide service in a wide area, and it is desirable that the radio communication terminal should be able to be used in an environment of a weak electric field. The radio communication terminal includes one reception circuit. Therefore, one of main antennas is adopted as the antenna.

In the embodiment, the mobile telephone 10 having the preferred transmission-reception function conforming to a plurality of radio communication systems is configured as follows:

The mobile telephone 10 of the embodiment has a main antenna, a subantenna, and reception circuitry and can perform communications selectively according to the second communication system (DMA2000 1× communication system, simply 1× communication system) for performing no diversity and the first communication system (CDMA2000 1×EV-DO communication system, simply EVDO communication system) to perform diversity and moreover has a reception function of a frequency band wherein the frequency bands in the 1× and EVDO communication system interfere with each other.

A part of transmission circuitry and a part of the reception circuitry are shared between the EVDO communication system as the first communication system and the 1× communication system as the second communication system.

When the mobile telephone 10 performs communications according to the 1× communication system, the reception circuitry performs communications only with the main antenna. When the mobile telephone 10 performs communications according to the EVDO communication system, the reception circuitry combines the signals received through the main antenna and the subantenna. The first impedance (for example, 50 ohms) matched in the frequency band used in performing communications according to the EVDO communication system is adopted for the subantenna.

When the mobile telephone 10 performs communications according to the 1× communication system, the reception circuitry has impedance changed to a different value from the first impedance. For example, the input impedance is opened or shorted for making a transition to a frequency different from that of the main antenna.

Figure 2:
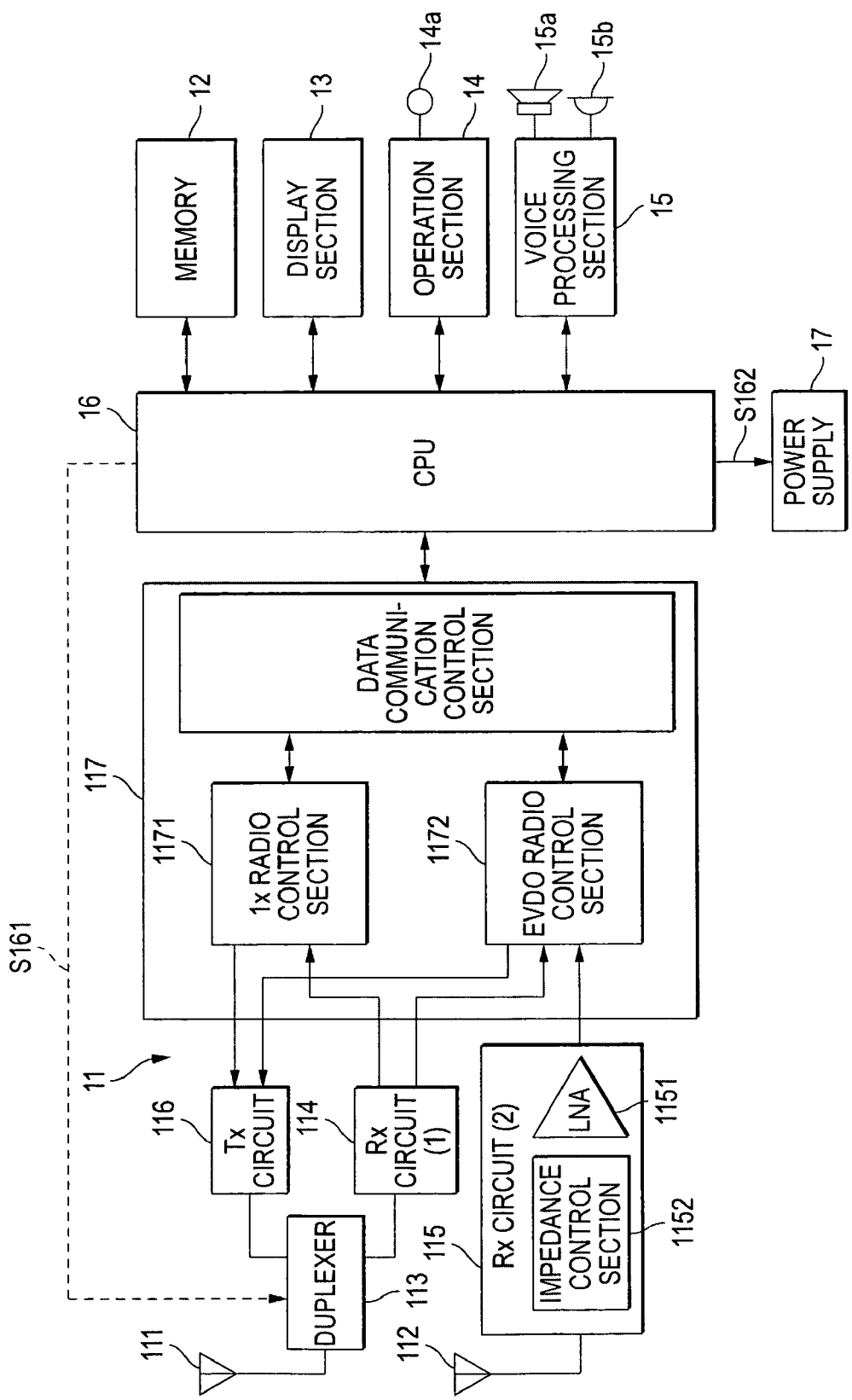
FIG. 2 is a block diagram to show one embodiment of the mobile telephone 10 as the radio communication terminal according to invention.

FIG. 2 is a block diagram to show an embodiment of the mobile telephone 10 as the radio communication terminal according to invention.

As shown in FIG. 2, the mobile telephone 10 of the embodiment has a radio communication section 11, a memory 12 as a storage section, a display section 13, an operation section 14 including a power key 14a, a voice processing section 15 including a speaker 15a and a microphone 15b, a user interface (I/F) control section (simply, control section) 16, and a power supply section 17.

In order to perform radio communications using radio waves, the radio communication section 11 modulates various pieces of information of image data, voice information, electronic mail, etc., processed by the control section 16 and transmits the information through a transmission-reception antenna to the communication network 30 including the base station 20.

The radio communication section 11 receives image data, voice information, electronic mail, etc., transmitted from the server 40 via the communication network 30, the base station 20 through the transmission-reception antenna, demodulates the received various information, and outputs the information to the control section 16.

In the 1× communication system, the radio communication section 11 performs establishment and release processing of a data link and establishment and release processing of radio connection under the control of the control section 16.

In this case, a communication session or the like is not held and thus when the power is on, the radio communication section 11 performs establishment processing of a communication session when radio connection is established (when communications are started), and performs only release processing when the radio connection is broken.

If the user operates the power key 14a of the operation section 14 for making a power-off request, the radio communication section 11 performs release processing of the data link and then performs release processing of the radio connection as requested by the control section 16.

In the EVDO communication system, the radio communication section 11 performs establishment and release processing of a data link, establishment and release processing of a communication session, and establishment and release processing of radio connection under the control of the control section 16.

In this case, the radio communication section 11 sends parameters used for communications to the network, establishes a communication session, and holds the communication session established regardless of whether or not the information to be communicated exists so that data communications can be performed instantly.

In the EVDO communication system, when the power is on, the radio communication section 11 always holds the communication session and therefore holds the communication session by performing reconnection processing immediately after releasing the communication session.

In this case, when releasing the communication session, the radio communication section 11 determines whether or not releasing the communication session is based on any factor other than the power-off command. If the radio communication section 11 determines that releasing the communication session is based on any factor other than the power-off command, the radio communication section 11 performs reconnection processing of the communication session.

If the user operates the power key 14a of the operation section 14 for making a power-off request, the radio communication section 11 performs release processing of the data link and then performs release processing of the communication session as requested by the control section 16, and then maintains the communication session released without performing reconnection processing of the communication session.

The radio communication section 11 has a main antenna 111, a subantenna 112, a changeover switch 113, a first reception circuit 114, a second reception circuit 115, a transmission circuit 116, and a base band section 117, for example, as shown in FIG. 2.

The changeover switch 113 switches connection of the main antenna 111 between the first reception circuit 114 and the transmission circuit 116 according to a switch control signal S161 of the control section 16.

The first reception circuit 114 includes a low-noise amplifier (LNA) or a share device, a demodulator, etc., and demodulates a pilot signal conforming to the 1× or EVDO communication system received through the main antenna 111 from the base station 20 via the changeover switch 113 into a multiplexed signal from the reception signal in the baseband in accordance with the demodulation system corresponding to the modulation system of the reception signal received from the base station 20. In the embodiment, for example, demodulation is executed according to any of the three types of demodulation systems of QPSK (quadri-phase shift keying), 8PSK (8 phase shift keying), 16QAM (16 quadri phase amplitude modulation).

The first reception circuit 114 outputs the provided signal to the base band section 117.

The second reception circuit 115 basically demodulates a pilot signal conforming to the EVDO communication system received through the subantenna 112 into a multiplexed signal from the reception signal in the baseband in accordance with the demodulation system corresponding to the modulation system of the reception signal received from the base station 20. In the embodiment, for example, demodulation is executed according to any of the three types of QPSK, 8PSK, 16QAM.

The second reception circuit 115 outputs the provided signal to the base band section 117.

The second reception circuit 115 sets the input impedance to 50 ohms for matching the covered frequencies of the subantenna with the reception band under the EVDO communication system.

The second reception circuit 115 has input impedance shifted in an open or short direction for making a transition to a frequency band different from that of the main antenna 111 under the 1× communication system.

The tolerance in a fading environment can be enhanced according to the diversity configuration, leading to improvement of the reception performance under the EVDO communication system, namely, in the EVDO mode.

In contrast, under the 1× communication system, namely, in the 1× mode, the second reception circuit 115 is not required at all and in addition, the subantenna 112 connected to the second reception circuit 115 causes interference with the main antenna 111 and produces an adverse effect.

The second reception circuit 115 includes an LNA 1151 and an impedance control section 1152 placed preceding the LNA 1151 and lessens interference in the 1× mode by the impedance control section 1152.

In the embodiment, to lessen interference in the 1× mode, the input impedance of the LNA 1151 in the second reception circuit 115 is used.

At the normal operation time, the input impedance of the LNA 1151 is 50 ohms. In the 1× mode, the second reception circuit 115 becomes non-operational and the input impedance at the time is shifted from 50 ohms.

The transmission circuit 116 transmits the information to be transmitted via the changeover switch 113, supplied by the base band section 117 to the communication network 30 including the base station 20 through the main antenna 111.

In the 1× communication system, the base band section 117 controls establishment and release processing of a data link and establishment and release processing of radio connection through the first reception circuit 114 and the transmission circuit 116 under the control of the control section 16.

In the EVDO communication system, the base band section 117 controls establishment and release processing of a data link, establishment and release processing of a communication session, and establishment and release processing of radio connection through the first and second reception circuits 114 and 115 and the transmission circuit 116 under the control of the control section 16.

The base band section 117 has main components of a 1× radio control section 1171, an EVDO radio control section 1172, and a data communication control section 1173 as shown in FIG. 2.

The 1× radio control section 1171 mainly controls establishment and release processing of radio connection through the first reception circuit 114 and the transmission circuit 116 at the 1× communication system time, namely, in the 1× communication mode.

Upon reception of a connection release request in the data communication control section 1173 in the 1× communication mode, the 1× radio control section 1171 performs release processing of the radio connection held established. When the power is on in the 1× communication mode, the 1× radio control section 1171 performs establishment processing of a communication session when radio connection is established (when communications are started), and performs only release processing when the radio connection is broken.

When the power is off, the 1× radio control section 1171 receives a power-off command of the control section 16 after the radio connection is released.

The EVDO radio control section 1172 controls establishment and release processing of a communication session and establishment and release processing of radio connection through the first and second reception circuits 114 and 115 and the transmission circuit 116 at the EVDO communication system time, namely, in the EVDO communication mode.

Upon reception of an EVDO communication session release request in the data communication control section 1173 in the EVDO communication mode, the EVDO radio control section 1172 performs release processing of the communication session, and inquires of the data communication control section 1173 whether or not releasing the communication session is based on a power-off command (for example, inquires whether or not a power-off flag is set). If releasing the communication session is based on a power-off command, the EVDO radio control section 1172 maintains the communication session released without performing reconnection processing of the communication session.

The EVDO radio control section 1172 inquires of the data communication control section 1173 whether or not releasing the communication session is based on a power-off command. If releasing the communication session is not based on a power-off command, the EVDO radio control section 1172 performs reconnection processing (re-establishment processing) of the communication session.

When the power is off, the EVDO radio control section 1172 receives a power-off command of the control section 16 after performing reconnection processing (re-establishment processing) of the communication session or after maintaining the communication session released after the communication session is released.

The data communication control section 1173 mainly controls establishment and release processing of a data link in the 1× communication mode and the EVDO communication mode.

Upon reception of a data session disconnection request regardless of whether or not a power-off indicator is added from the control section 16 in the 1× communication mode, the data communication control section 1173 releases the data link and issues a connection release request to the 1× radio control section 1171 in the data link released state.

Upon reception of a data session disconnection request to which no power-off indicator is added from the control section 16 in the EVDO communication mode, the data communication control section 1173 releases the data link without setting the power-off flag and issues a connection release request to the EVDO radio control section 1172 in the data link released state.

Upon reception of a data session disconnection request to which a power-off indicator is added from the control section 16 in the EVDO communication mode, the data communication control section 1173 sets the power-off flag, releases the data link, and issues a connection release request to the EVDO radio control section 1172 in the data link released state.

Upon reception of an inquiry about the power-off flag set state from the EVDO radio control section 1172, the data communication control section 1173 informs the EVDO radio control section 1172 whether or not the power-off flag is set.

Under the EVDO communication system, the base band section 117 performs the following operation under the control of the EVDO radio control section 1172 and the data communication control section 1173:

The base band section 117 inputs reception data demodulated in the first reception circuit 114 and the second reception circuit 115 and performs decoding processing by a decoder (not shown), specifically performs inverse spectrum spread of reception multiplexed signal subjected to spectrum spread. The base band section 117 combines the signals provided by the first and second reception circuits 114 and 115 according to the maximum specific combining method or the minimum mean squared error method, compensating for degradation of the reception performance in a fading environment.

If reception data allocated to the home station (for example, conversation signal from the associated party, data to be downloaded, etc.,) exists, the reception data is output from the decoder to the control section 16.

Further, in the process of the decoding processing, the decoder finds Ec/Io (pilot signal strength to total reception signal strength) and calculates CIR (carrier to interference ratio) based on the following equation (1):

(Equation 1)

$$CIR=(Ec/Io)/(1-Ec/Io) \quad (1)$$

CIR found based on this equation is output from the decoder to a predicting device (not shown), which then predicts the CIR value at the next reception slot timing (where one slot is 1.6 ms=1/600 s).

The prediction method is not limited; by way of example, a method of linear prediction, etc., is available. Information indicating how many slots the predicting device needs to predict the CIR after is contained in various control signals transmitted from the base station 20 when the power of the mobile telephone 10 is on. The predicted CIR found by the predicting device is supplied to a CIR-DRC conversion section (not shown).

The CIR-DRC conversion section converts the predicted CIR into DRC based on a CIR-DRC conversion table (not shown). The DRC (Data Rate Control Bit) means the maximum communication speed at which data can be received at a predetermined error rate or less in the mobile telephone 10, expected from the predicted CIR. The DRC corresponding to the reference CIR is defined in the CIR-DRC conversion table. If the input predicted CIR is the reference CIR, the CIR-DRC conversion section outputs the DRC corresponding to the CIR to the control section 16.

On the other hand, if the predicted CIR input from the predicting device is not the reference CIR, the DRC corresponding to the reference CIR closest to the input predicted CIR is acquired or interpolation is performed from the two CIR values closest to the input predicted CIR, whereby the DRC corresponding to the resultant CIR is acquired. Accordingly, the DRC corresponding to each predicted CIR can be acquired and it is made possible to inform the user of the more precise reception state.

The base band section 117 multiplexes the DRC and transmission data output from the control section 16 by a multiplexer and further codes by a coder and then outputs to the transmission circuit 116.

Under the 1x communication system, the base band section 117 performs the following operation under the control of the 1x radio control section 1171 and the data communication control section 1173:

The base band section 117 inputs reception data demodulated in the first reception circuit 114 and performs decoding processing by the decoder (not shown), specifically performs inverse spectrum spread of reception multiplexed signal subjected to spectrum spread.

If reception data allocated to the home station (for example, conversation signal from the associated party, data to be downloaded, etc.,) exists, the reception data is output from the decoder to the control section 16.

Further, in the process of the decoding processing, the decoder finds Ec/Io (pilot signal strength to total reception signal strength) and calculates CIR (carrier to interference ratio) based on the above-mentioned equation (1) and outputs the CIR to the transmission circuit 116.

The base band section 117 multiplexes the transmission data output from the control section 16 by the multiplexer and further codes by the coder and then outputs to the transmission circuit 116.

FIG. 3 is a drawing to show the operation state of each of the circuits in the EVDO communication mode and the 1x communication mode of the radio communication section 11.

As shown in FIG. 3, in the radio communication section 11, in the EVDO communication mode whose main use is data communications, the first reception circuit 114, the second reception circuit 115, and the transmission circuit 116 are in an operation state, and the second reception circuit 115 has the input impedance held in 50 ohms of the input impedance of the LNA 1151 by the impedance control section 1152.

In the radio communication section 11, in the 1x communication mode whose main use is voice communications, the first reception circuit 114 and the transmission circuit 116 are in the operation state and the second reception circuit 115 is in a non-operational state and has the input impedance shifted from 50 ohms of the input impedance of the LNA 1151 by the impedance control section 1152.

The memory 12 includes nonvolatile memory such as EEPROM and previously stores any desired communication speed for each communication system, such as a speed display table.

The display section 13 has a display device such as a liquid crystal display (LCD) or electroluminescence (EL), and displays the telephone number entered for the conversation function, various messages, text data, etc., under the control of the control section 16.

When the power is turned off, the display section 13 produces power-off display upon reception of a power-off command of the control section 16.

The operation section 14 has a plurality of keys such as a termination (ring off)/power key, a start (calling) key, numeric keys, etc. As the user operates any of the keys, the operation section 14 supplies the user-entered information to the control section 16.

The voice processing section 15 has a voice processing circuit and for the conversation function, the speaker 15a for performing voice output and the microphone 15b for performing voice input are connected to the voice processing section 15.

The voice processing section 15 performs predetermined processing for voice collected through the microphone 15b in the radio communication mode and outputs the processing result to the control section 16.

The voice processing section 15 performs predetermined processing for voice information supplied by the control section 16 and produces voice from the speaker 15a.

The control section 16 is implemented mainly as a microcomputer for controlling the whole of the mobile telephone 10.

For example, the control section 16 controls radio transmission and reception of various pieces of information in the radio communication section 11, processes voice information for the voice processing section 15, displays information on the display section, performs change control in the cursor display form, performs cursor on/off control, performs processing responsive to input information through the operation section 14, performs access control to the memory 12, etc.

The control section 16 enables radio communications in accordance with any desired communication system through the radio communication section 11 in the radio communication mode, and displays a standard screen just after the power is turned on (standby screen) on the display section 13. The radio communication mode enables the user to call, etc., by operating the operation section 14.

When data communications terminate, the control section 16 outputs a data session disconnection request to the data communication control section 1173.

If the control section 16 recognizes that the power should be turned off as the user operates the power key 14a of the operation section 14 when the power is on, the control section 16 outputs a data session disconnection request with a power-off indicator to the data communication control section 1173 of the base band section 117.

When the timing of turning off the power is reached, the control section 16 transmits a power on command to the 1× radio control section 1171 or the EVDO radio control section 1172 and transmits a power-off command to the display section 13 for producing power-off display and then outputs a control signal S162 to the power supply section 17 for turning off the power.

When DRC is input from the base band section 117 of the radio communication section 11, the control section 16 determines whether or not transmission data generated in the mobile telephone 10 exists. If transmission data exists, the control section 16 outputs the transmission data together with the DRC to the base band section 117. On the other hand, if transmission data does not exist, the control section 16 outputs the DRC input from the CIR-DRC conversion section to the base band section 117.

The DRC and the transmission data output from the control section 16 are transmitted via the radio communication section 11 to the base station 20. In the EVDO communication system, the base station 20 determines which portable communication terminal the next slot is used for transmission to and the communication speed (modulation speed) in the transmission based on the DRC received from the mobile telephone 10.

In the 1× communication system, the data communication speed in the direction from the base station 20 to the mobile telephone 10 as radio communication terminal can also be determined based on the instantaneous value of the CIR (carrier to interference ratio) indicating the reception state in the portable communication terminal.

That is, in CDMA of widely available communication system at present, unlike the EVDO communication system, change in the data communication speed depending on the location is not much noticeable and therefore the necessity for informing the user of the reception state, etc., in an instant is low and the reception state, etc., is also determined based on the instantaneous values of Ec/Io (pilot signal strength to total reception signal strength), CIR, etc., found from the pilot signal received from the base station 20 and the down communication speed is determined.

Therefore, in the EVDO communication system, the control section 16 predicts and determines the down data communication speed based on the reception state of the signal from the base station 20 as described above.

The EVDO communication system has the characteristic that the data communication speed in the direction from the base station 20 to the mobile telephone 10 as radio communication terminal largely changes depending on the reception state in the mobile telephone 10 (for example, received electric field strength, carrier to interference ratio=CIR).

For example, if the mobile telephone 10 is in the best reception state, data communications at communication speed 2.4 Mbps are made possible; when the reception state is poor, the data communication speed is lowered to about several 10 kbps.

That is, in the EVDO communication system, unlike the 1× communication system, the down data communication speed is not simply determined based on the instantaneous value of the CIR (carrier to interference ratio) indicating the reception state and changes according to prediction, correction using the statistical data of the error rate of down data transmission in the past, etc., and the like.

Thus, in the EVDO communication system, change in the data communication speed depending on the location is noticeable as described above and therefore it is necessary to inform the user of the extremely precise data communication speed in an instant.

Thus, in the embodiment, the user is informed of the DRC directly indicating the extremely precise data communication speed found considering prediction, correction using the statistical data of the error rate of down data transmission in the past, etc., and the like, so that the user can keep track of the precise data communication speed and at the data communication start time, can easily find the location suitable for data communications and can start data communications in the environment suitable for communications. Since the above-described DRC is a value derived from the predicted CIR, the derived DRC is also a future value (for example, 1/600 s ahead).

The operation of the circuitry in FIG. 2 will be discussed centering on release processing of data link and communication session when the power is off with reference to FIGS. 4 and 5.

Figure 4:
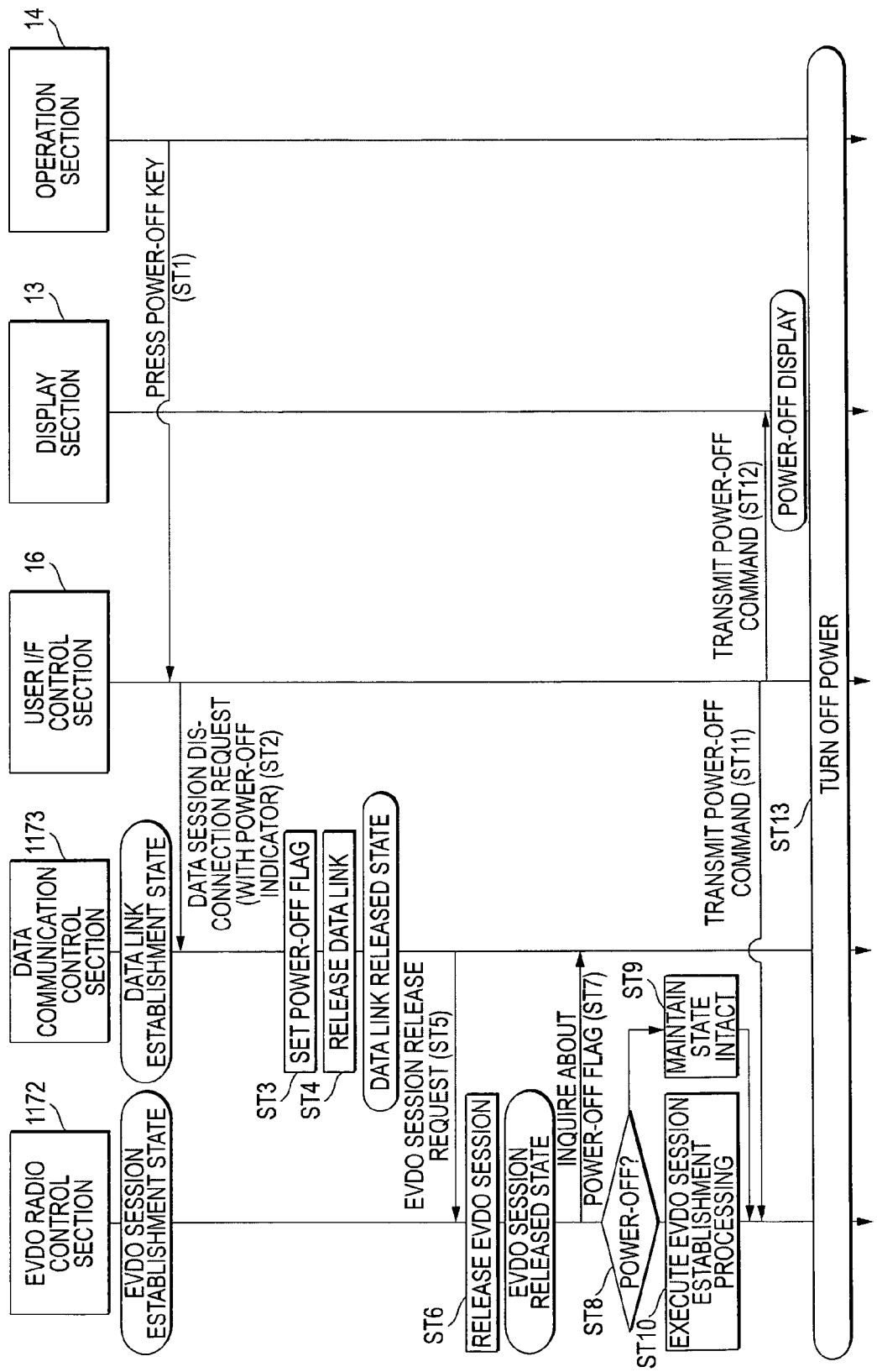
FIG. 4 is a diagram to describe release processing of data link and communication session when the power is off in the EVDO communication mode.

FIG. 4 is a diagram to describe release processing of data link and communication session when the power is off in the EVDO communication mode.

Figure 5:
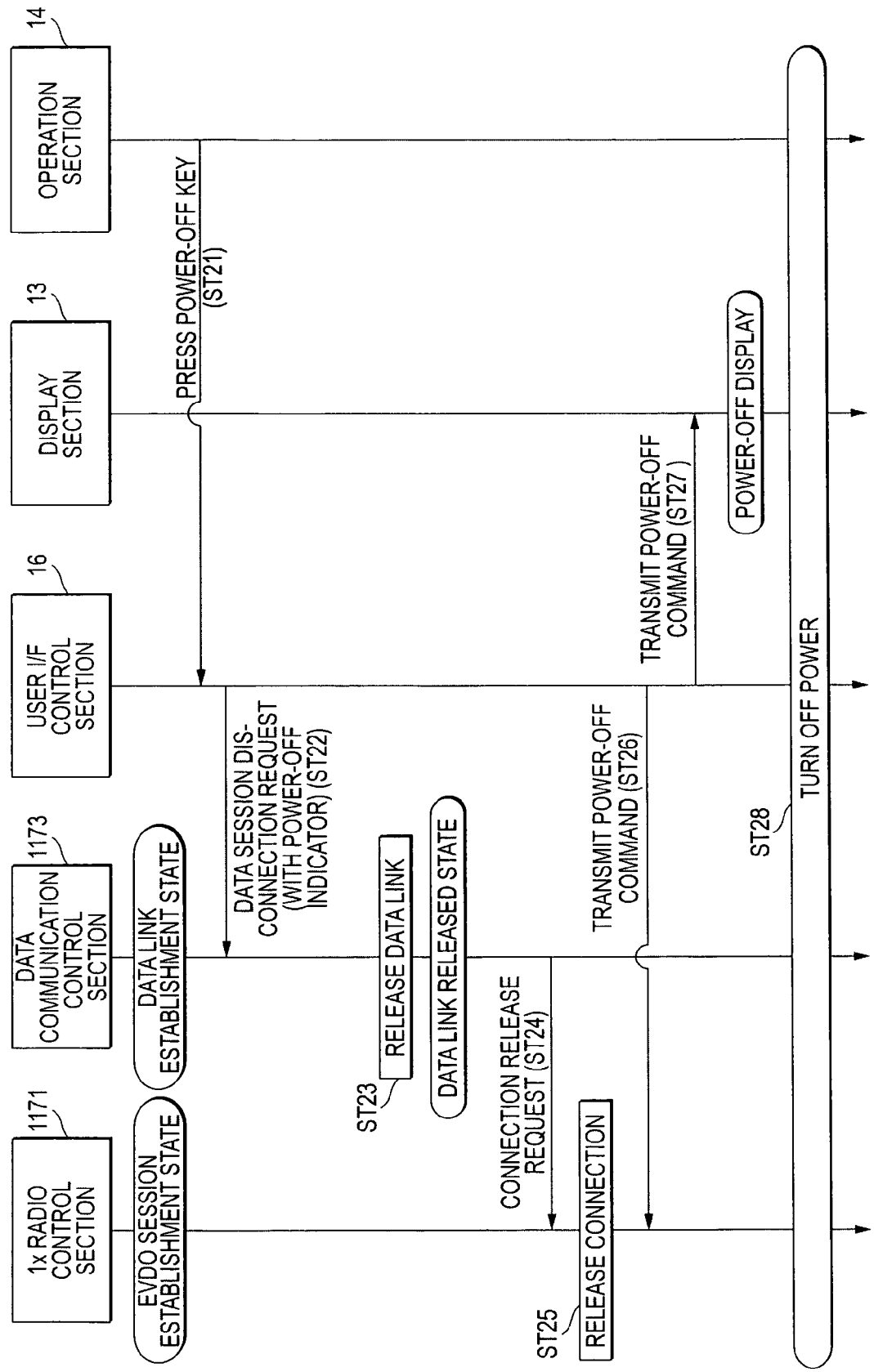
FIG. 5 is a diagram to describe release processing of data link and communication session when the power is off in the 1× communication mode.
Figure 6:
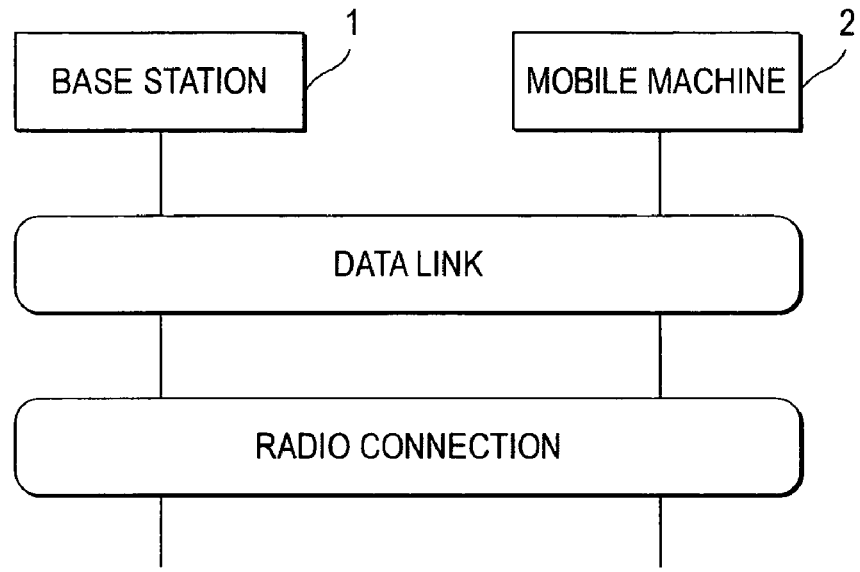
FIG. 6 is a schematic representation for performing radio communications in accordance with CDMA2000 1× communication system.
Figure 7:
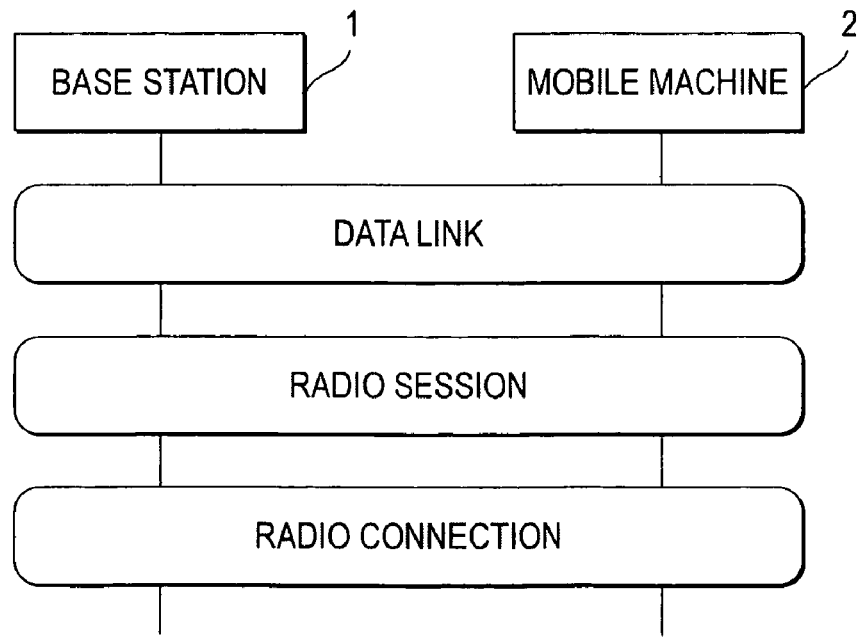
FIG. 7 is a schematic representation for performing radio communications in accordance with CDMA2000 1×EV-DO communication system.

FIG. 5 is a diagram to describe release processing of data link and communication session when the power is off in the 1× communication mode.

In the description that follows, it is assumed that in the EVDO communication mode, data link is controlled to the establishment state by the data communication control section 1173 and communication session and radio connection are controlled to the establishment state by the EVDO radio control section 1172 and that in the 1× communication mode, data link is controlled to the establishment state by the data communication control section 1173 and radio connection is controlled to the establishment state by the EVDO radio control section 1172.

In the EVDO communication mode, in the radio communication section 11, the first reception circuit 114, the second reception circuit 115, and the transmission circuit 116 enter the operation state. The second reception circuit 115 has the input impedance held in 50 ohms of the input impedance of the LNA 1151 by the impedance control section 1152.

Accordingly, diversity configuration is provided and the reception data through the main antenna 111 and the subantenna 112 is used.

In the first reception circuit 114, the pilot signal conforming to the EVDO communication system from the base station 20 through the changeover switch 113, received at the main antenna 111 is demodulated into a multiplexed signal from the reception signal in the baseband according to the demodulation system corresponding to the modulation system of the reception signal from the base station 20, and the multiplexed signal is output to the base band section 117.

In the second reception circuit 115, the pilot signal conforming to the EVDO communication system received at the subantenna 112 is demodulated into a multiplexed signal from the reception signal in the baseband according to the demodulation system corresponding to the modulation system of the reception signal from the base station 20, and the multiplexed signal is output to the base band section 117.

The base band section 117 inputs the reception data demodulated in the first reception circuit 114 and the second reception circuit 115, and performs inverse spectrum spread of the reception multiplexed signal subjected to spectrum spread. The base band section 117 combines the signals provided by the first and second reception circuits 114 and 115 according to the maximum specific combining method or the minimum mean squared error method, compensating for degradation of the reception performance in the fading environment.

For example, if reception data allocated to the home station (for example, conversation signal from the associated party, data to be downloaded, etc.,) exists, the reception data is output from the decoder to the control section 16.

The base band section 117 multiplexes the DRC and transmission data output from the control section 16 by the multiplexer and further codes by the coder and then outputs to the transmission circuit 116.

As shown in FIG. 4, in the EVDO communication mode, if the user operates the power key 14*a* of the operation section 14 (ST1), the control section 16 recognizes that the power should be turned off because the user operates the power key 14*a* of the operation section 14 when the power is on, and the control section 16 outputs a data session disconnection request with a power-off indicator to the data communication control section 1173 of the base band section 117 (ST2).

Upon reception of the data session disconnection request, the data communication control section 1173 sets the power-off flag (ST3) and performs release processing of the data link (ST4).

In the data link released state, the data communication control section 1173 outputs an EVDO communication session release request to the EVDO radio control section 1172 (ST5).

The EVDO radio control section 1172 performs release processing of the communication session in response to the EVDO communication session release request (ST6).

In the communication session released state, the EVDO radio control section 1172 inquires of the data communication control section 1173 whether or not the power-off flag is set to determine whether or not releasing the communication session is based on a power-off command (ST7 and ST8).

In this case, releasing the communication session is based on a power-off command and thus the data communication control section 1173 informs the EVDO radio control section 1172 that the power-off flag is set.

When the EVDO radio control section 1172 is informed that the power-off flag is set, the EVDO radio control section 1172 determines that releasing the communication session is based on a power-off command, and maintains the communication session released without performing reconnection processing (re-establishment processing) of the communication session (ST9).

On the other hand, if the user does not operate the power key and the power-off flag is not set, the EVDO radio control section 1172 determines that releasing the communication session is not based on a power-off command, and performs reconnection processing (re-establishment processing) of the communication session (ST10).

When the timing of turning off the power is reached, the control section 16 transmits a power on command to the 1× radio control section 1171 or the EVDO radio control section 1172 (ST11).

The control section 16 also transmits a power-off command to the display section 13 for producing power-off display (ST12) and then outputs a control signal S162 to the power supply section 17 for turning off the power (ST13).

Thus, in the EVDO communication mode, when the power is turned off, the communication session is maintained released without performing reconnection processing of the communication session, so that the protocol sequence is not affected and re-establishment processing of the communication session when the power is off is skipped and thus the time required for turning off the power is shortened.

In the 1× communication mode, in the radio communication section 11, the first reception circuit 114 and the transmission circuit 116 enter the operation state and the second reception circuit 115 enters the non-operational state.

The second reception circuit 115 has the input impedance shifted from 50 ohms of the input impedance of the LNA 1151 by the impedance control section 1152.

In the first reception circuit 114, the pilot signal conforming to the 1× communication system from the base station 20 through the changeover switch 113, received at the main antenna 111 is demodulated into a multiplexed signal from the reception signal in the baseband according to the demodulation system corresponding to the modulation system of the reception signal from the base station 20, and the multiplexed signal is output to the base band section 117.

Under the 1× communication system, the base band section 117 inputs the reception data demodulated in the first reception circuit 114 and performs inverse spectrum spread of the reception multiplexed signal subjected to spectrum spread.

If reception data allocated to the home station (for example, conversation signal from the associated party, data to be downloaded, etc.) exists, the reception data is output from the decoder to the control section 16.

The base band section 117 multiplexes the transmission data output from the control section 16 by the multiplexer and further codes by the coder and then outputs to the transmission circuit 116.

As shown in FIG. 5, in the 1× communication mode, if the user operates the power key 14*a* of the operation section 14 (ST21), the control section 16 recognizes that the power should be turned off because the user operates the power key 14*a* of the operation section 14 when the power is on, and the control section 16 outputs a data session disconnection request with a power-off indicator to the data communication control section 1173 of the base band section 117 (ST22).

Upon reception of the data session disconnection request, the data communication control section 1173 performs release processing of the data link (ST23).

In the data link released state, the data communication control section 1173 outputs a 1× communication connection release request to the 1× radio control section 1171 (ST24).

The 1× radio control section 1171 performs connection release processing in response to the connection release request (ST25).

When the timing of turning off the power is reached, the control section 16 transmits a power on command to the 1× radio control section 1171 or the EVDO radio control section 1172 (ST26).

The control section 16 also transmits a power-off command to the display section 13 for producing power-off display (ST27) and then outputs a control signal S162 to the power supply section 17 for turning off the power (ST28).

As described above, according to the embodiment, the communication terminal conforming to the EVDO communication system for sending the parameters used for communications to the network, establishing a communication session, and keeping the communication session established regardless of whether or not the information to be communicated exists so that data communications can be performed instantly has the EVDO radio control section 1172 for performing radio communication control based on the EVDO communication system and the data communication control section 1173 for releasing the data link and requesting the EVDO radio control section 1172 to release the communication session if a power-off command is entered. The EVDO radio control section 1172 releases the communication session in response to the communication session release request made by the data communication control section 1173. If releasing the communication session is based on the power-off command, the EVDO radio control section 1172 maintains the communication session released; if releasing the communication session is based on any factor other than the power-off command, the EVDO radio control section 1172 performs reconnection processing of the communication session. Thus, the protocol sequence is not affected and re-establishment processing of the communication session when the power is off is skipped, so that the time required for turning off the power can be shortened.

That is, interrupting the protocol sequence can be prevented and the load on the base station can be decreased.

For simplicity of the description, the data link has been represented using the terms of communication session, communication connection, and data session. The invention can be applied in the PPP wherein the communication session is "SessionLayer," the communication connection is "ConnectionLayer" closer to a physical layer, and the data session is above the layers in EVDO defined in 3GPP2, for example.

What is claimed is:

1. A communication terminal, comprising:
a radio control section which performs radio communications conforming to a communication system for establishing a communication session by sending a parameter used for communications to a network, and performing a re-establishment processing of the communication session in response to the communication session being released so as to keep the communication session established regardless of whether or not information to be communicated exists,
wherein when the radio control section releases the communication session based on a power-off processing of the communication terminal, the radio control section maintains the communication session released without performing the re-establishment processing of the communication session.

2. The communication terminal according to claim 1,
wherein when the radio control section releases the communication session based on any processing other than the power-off processing, the radio control section performs the reconnection processing of the communication session.

3. The communication terminal according to claim 1, further comprising a determination section which determines whether the communication session is released based on the power-off processing,
wherein if it is determined that the communication session is release based on the power-off processing, the radio control section maintains the communication session released without performing the re-establishment processing of the communication session, and
wherein if it is determined that the communication session is released not based on the power-off processing, the radio control section performs the re-establishment processing of the communication session.

4. The communication terminal according to claim 1, further comprising a power key,
wherein the power-off processing is performed according to an operation of the power key.

5. A communication terminal, comprising:
a radio control section which performs radio communications conforming to a communication system for performing communications by connecting a physical connection by radio, a communication session for deciding a communication condition by sending a parameter used for communications to a network, and a data link for transmitting and receiving data in sequence with the network, and performing a reconnection processing of the communication session in response to the communication session being released so as to keep the communication session established regardless of whether or not information to be communicated exists,
wherein when the radio control section releases the communication session based on a power-off processing of the communication terminal, the radio control section maintains the communication session released without performing the reconnection processing of the communication session.

6. The communication terminal according to claim 5,
wherein when the radio control section releases the communication session based on any processing other than the power-off processing, the radio control section performs the reconnection processing of the communication session.

7. The communication terminal according to claim 5, further comprising a determination section which determines whether the communication session is released based on the power-off processing,
wherein if it is determined that the communication session is release based on the power-off processing, the radio control section maintains the communication session released without performing the re-establishment processing of the communication session, and
wherein if it is determined that the communication session is released not based on the power-off processing, the radio control section performs the re-establishment processing of the communication session.

8. The communication terminal according to claim 5, further comprising a power key,
wherein the power-off processing is performed according to an operation of the power key.

9. A communication terminal, comprising:
a radio control section which performs radio communications conforming to a first communication system for establishing a communication session by sending a parameter used for communications to a network, and performing a re-establishment processing of the communication session in response to the communication session being released so as to keep the communication session established regardless of whether or not information to be communicated exists, and a second communication system for sharing a communication section with the first communication system and enabling to establish the communication session when a communication connection is established,
wherein when the radio control section performs radio communications conforming to the first communication system and the radio control section releases the communication session based on a power-off processing of the communication terminal, the radio control section maintains the communication session released without performing the re-establishment processing of the communication session.

10. The communication terminal according to claim 9, wherein the radio control section is on standby with the second communication system and is commanded to make a transition from the second communication system to the first communication system.

11. The communication terminal according to claim 9, wherein when the radio control section releases the communication session based on any processing other than the power-off processing, the radio control section performs the reconnection processing of the communication session.

12. The communication terminal according to claim 9, further comprising a determination section which determines whether the communication session is released based on the power-off processing,
wherein if it is determined that the communication session is release based on the power-off processing, the radio control section maintains the communication session released without performing the re-establishment processing of the communication session, and
wherein if it is determined that the communication session is released not based on the power-off processing, the radio control section performs the re-establishment processing of the communication session.

13. The communication terminal according to claim 9, further comprising a power key,
wherein the power-off processing is performed according to an operation of the power key.

14. A communication terminal conforming to a communication system for establishing a communication session by sending a parameter used for communications to a network, and performing a re-establishment processing of the communication session in response to the communication session being released so as to keep the communication session established regardless of whether or not information to be communicated exists, comprising:
a radio control section which performs radio communications based on the communication system; and
a data communication control section which releases a data link and requests the radio control section to release the communication session if a power-off command is entered,
wherein the radio control section releases the communication session in response to the communication session release request made by the data communication control section, and when the radio control section releases the communication session based on a command for a power-off processing of the communication terminal, the radio control section maintains the communication session released without performing the re-establish processing of the communication session.

15. The communication terminal according to claim 14, wherein when the radio control section releases the communication session based on any command other than the command of the power-off processing, the radio control section performs the reconnection processing of the communication session.

16. The communication terminal according to claim 14, further comprising a determination section which determines whether the communication session is released based on the power-off processing,
wherein if it is determined that the communication session is release based on the power-off processing, the radio control section maintains the communication session released without performing the re-establishment processing of the communication session, and
wherein if it is determined that the communication session is released not based on the power-off processing, the radio control section performs the re-establishment processing of the communication session.

17. The communication terminal according to claim 14, further comprising a power key,
wherein the power-off processing is performed according to an operation of the power key.

18. A communication method of a communication terminal which performs radio communications conforming to a first communication system for establishing a communication session by sending a parameter used for communications to a network, and performing a re-establishment processing of the communication session in response to the communication session being released so as to keep the communication session established regardless of whether or not information to be communicated exists, and a second communication system for sharing a communication section With the first communication system and enabling to establish the communication session when a communication connection is established,
wherein when the communication terminal performs radio communications conforming to the first communication system and the communication session is released based on a power-off processing of the communication terminal, the communication session is maintained released without performing the re-establishment processing of the communication session.

19. The communication method according to claim 18, further comprising:
determining whether the communication session is released based on the power-off processing,
maintaining the communication session released without performing the re-establishment processing of the communication session if it is determined by the determining section that the communication session is release based on the power-off processing,
performing the re-establishment processing of the communication session if it is determined by the determining section that the communication session is released not based on the power-off processing.

20. The communication method according to claim 10, further comprising:
performing the power-off processing is performed according to an operation of a power key.

* * * * *